United States Patent
Lam et al.

(10) Patent No.: US 10,090,675 B1
(45) Date of Patent: *Oct. 2, 2018

(54) FAST SETTLEMENT OF SUPPLEMENT CONVERTER FOR POWER LOSS PROTECTION SYSTEM

(71) Applicant: Active-Semi, Inc., Tortola (VG)

(72) Inventors: Thuc Huu Lam, Nghe an Province (VN); Hue Khac Trinh, Hanoi (VN); Hiroshi Watanabe, Tokyo (JP)

(73) Assignee: Active-Semi, Inc. (VG)

( * ) Notice: Subject to any disclaimer, the term of this patent is extended or adjusted under 35 U.S.C. 154(b) by 2 days.

This patent is subject to a terminal disclaimer.

(21) Appl. No.: 15/476,977

(22) Filed: Apr. 1, 2017

Related U.S. Application Data

(60) Provisional application No. 62/354,741, filed on Jun. 25, 2016.

(51) Int. Cl.
| | |
|---|---|
| *H02J 1/10* | (2006.01) |
| *H02M 3/158* | (2006.01) |
| *H02J 1/12* | (2006.01) |
| *H02J 1/14* | (2006.01) |
| *H02M 7/49* | (2007.01) |
| *H02M 5/46* | (2006.01) |

(52) U.S. Cl.
CPC ............... *H02J 1/102* (2013.01); *H02J 1/12* (2013.01); *H02J 1/14* (2013.01); *H02M 3/1582* (2013.01); *H02M 3/1584* (2013.01); *H02M 5/46* (2013.01); *H02M 7/49* (2013.01)

(58) Field of Classification Search
CPC ...... H02J 1/12; H02J 1/102; H02J 1/14; H02J 1/02; H02J 7/0029; H02J 7/0065; H02J 7/0068; H02J 7/007; H02M 1/08; H02M 1/32; H02M 1/36; H02M 3/1582; H02M 3/1584; H02M 2001/0009; H02M 3/158; H02M 5/46; H02M 7/49
See application file for complete search history.

(56) References Cited

U.S. PATENT DOCUMENTS

| | | | |
|---|---|---|---|
| 9,705,402 B1 * | 7/2017 | Carpenter, Jr. | .... H01H 85/0241 |
| 9,946,279 B1 * | 4/2018 | Dinh | ......................... G05F 1/56 |
| 2009/0200982 A1 * | 8/2009 | Hurtz | .................... G06F 1/3203 320/103 |

(Continued)

*Primary Examiner* — Gustavo Rosario Benitez
(74) *Attorney, Agent, or Firm* — Imperium Patent Works; T. Lester Wallace; Amir V. Adibi

(57) ABSTRACT

A power loss protection integrated circuit includes a VIN terminal, a VOUT terminal, an STR terminal, a switch circuit (eFuse), a control circuit, and a prebiasing circuit. In a normal mode, current flows from a power source, into VIN, through the eFuse, out of VOUT, and to the output node. A switching converter of which the control circuit is a part is disabled. If a switch over condition then occurs, the eFuse is turned off and the switching converter starts operating. The switching converter receives energy from STR and drives the output node. Switch over is facilitated by prebiasing. Prior to switch over, the prebiasing circuit prebiases a control loop node as a function of eFuse current flow prior to switch over. When the switching converter begins operating, the node is already prebiased for the proper amount of current to be supplied by the switching converter onto the output node.

21 Claims, 15 Drawing Sheets

(56) References Cited

U.S. PATENT DOCUMENTS

| | | | |
|---|---|---|---|
| 2010/0277142 A1* | 11/2010 | Tan .................. | H02M 7/53803 |
| | | | 323/268 |
| 2012/0139500 A1* | 6/2012 | Ye ........................ | H02J 7/0068 |
| | | | 320/135 |
| 2013/0038273 A1* | 2/2013 | Riggio .................... | H02J 7/00 |
| | | | 320/107 |
| 2013/0088203 A1* | 4/2013 | Solie ...................... | H02J 7/022 |
| | | | 320/129 |
| 2015/0042292 A1* | 2/2015 | Mao ....................... | H02J 7/045 |
| | | | 320/162 |
| 2015/0155783 A1* | 6/2015 | Li ........................ | H03F 1/0227 |
| | | | 323/271 |

* cited by examiner

COMPARE-AND-MASK CIRCUIT

STATE DIAGRAM FOR THE CAPACITOR HEALTH
MONITOR STATE MACHINE

| TSET[3:0] | MILLISECONDS |
|---|---|
| 0000 | 2 |
| 0001 | 4 |
| 0010 | 8 |
| 0011 | 16 |
| 0100 | 32 |
| 0101 | 64 |
| 0110 | 128 |
| 0111 | 256 |
| 1000 | 384 |
| 1001 | 512 |
| 1010 | 640 |
| 1011 | 768 |
| 1100 | 896 |
| 1101 | 1024 |
| 1110 | 1152 |
| 1111 | 1280 |

TSET LOOKUP TABLE

CAPACITOR HEALTH CHECK

VOLTAGE REFERENCE CIRCUIT

I2C INTERFACE AND DIGITAL REGISTER CONTROL AND DIGITAL STATE MACHINE

VOLTAGE CLIPPING CIRCUIT

CURRENT SENSE CIRCUIT

US 10,090,675 B1

FAST SETTLEMENT OF SUPPLEMENT CONVERTER FOR POWER LOSS PROTECTION SYSTEM

CROSS-REFERENCE TO RELATED APPLICATION

This application claims the benefit under 35 U.S.C. § 119 of provisional application Ser. No. 62/354,741, entitled "Fast Settlement Of Supplement Converter For Power Loss Protection System", filed Jun. 25, 2016. The entirety of provisional application Ser. No. 62/354,741 is incorporated herein by reference.

TECHNICAL FIELD

The present disclosure relates generally power loss protection circuits and to related methods.

BACKGROUND INFORMATION

Capacitors and/or batteries are used to store energy in power loss protection systems. FIG. 1 (Prior Art) illustrates one example of a power loss protection system 100 for powering a device. The power loss protection system 100 involves a so-called "eFuse" 101, a switch component 102, enable trip point resistors 103 and 104, a boost converter circuit 105, a bank of capacitors and/or batteries 106, and a voltage regulator 107. This circuitry is soldered onto a printed circuit board. During normal operation of the power loss protection system, when the system is powering the device, the boost converter 105 receives some of the power from the eFuse output and uses that to charge the capacitors and/or batteries 106. If VIN at input 109 is then suddenly lost, for example due to a condition like a power brown out condition or a power cord disconnection event, then the eFuse turns off immediately and the fault signal is asserted. The fault signal is received by the second switch SW2 102. The second switch SW2 102 responds by turning on so that power can then be supplied onto node 108 from the capacitors and/or batteries 106 in the place of the lost power. The linear voltage regulator 107 reduces the capacitor voltage down to the supply voltage "VSYS" required by the device being powered. The required system power and supply voltage VSYS can therefore be maintained for long enough to allow data that is stored in the device in volatile memory to be transferred into non-volatile storage before system power is lost altogether. This kind of prior art power loss protection system is used to power devices where high reliability is required, such as in computers like laptops and servers. If capacitors are used for block 106, then the capacitance of the capacitors must be large enough that the energy stored in the capacitors can sustain system power long enough to allow the device to complete a safe power-off sequence involving backup of configuration information and status after a loss of VIN is detected. The capacitors are sized accordingly to account for anticipated system operation and the needs of the device being powered.

SUMMARY

A power loss protection integrated circuit includes a first terminal VIN, a second terminal VOUT, a third terminal STR, a current switch circuit (an eFuse), a switching converter control circuit, and a prebiasing circuit.

The current switch circuit has an on state and an off state. In the on state, the current switch circuit provides a low resistance current path from the first terminal, through the current switch circuit, out of the integrated circuit via the second terminal, and to an output node. In one example, the second terminal VOUT is a part of the output node. In the off state, the current switch circuit decouples the first terminal from the second terminal. In one example of the current switch circuit, the current switch circuit outputs a sense current signal SC2. The sense current signal SC2 is indicative of a magnitude of current flow through the current switch circuit.

The switching converter control circuit is a part of a switching converter. The switching converter has a buck on state. The switching converter control circuit is coupled to receive a supply voltage from the third terminal such that the switching converter in the buck on state is powered and drives a lower regulated output voltage onto the output node. If the switching converter is not in the buck on state then the switching converter does not drive any regulated voltage onto the output node.

The prebiasing circuit is coupled to drive a prebias signal onto a control loop node of the switching converter control circuit. The control loop node may, for example, be a node at the output of a feedback error amplifier. The prebiasing circuit is enabled to drive the prebias signal onto this control loop node if the switching converter is not in the buck on state, but the prebiasing circuit is disabled from driving the prebias signal onto the control loop node if the switching converter is in the buck on state.

In one operational example, the current switch circuit is initially in its on state, the switching converter is not in its buck on state, and the prebiasing circuit is driving the prebias signal onto the control loop node of the switching converter control circuit. Power is being supplied from the first terminal VIN, through the current switch circuit of the power loss protection integrated circuit, out of the power loss protection integrated circuit through the second terminal VOUT, and to a load. A switch over condition then occurs. In one example, the switch over condition is a fault condition due to the loss of power at the first terminal VIN. Due to the loss of power, current flow through the current switch circuit from the first terminal VIN to the second terminal VOUT and to the output node is inadequate to maintain a desired voltage (for example, 3.3 volts) on the output node. Accordingly, the switch over condition is detected by the power loss integrated circuit, and in response: 1) the current switch circuit is put into its off state, 2) the prebiasing circuit is disabled so that it no longer drives any prebias signal onto the control loop node of the switching converter control circuit, and 3) the switching converter is made to begin operating in its buck on mode. Before the voltage on the output node can drop out of specification, the switching converter operating as a buck converter converts a relatively high voltage present on the third terminal STR (for example, 36 volts DC as supplied onto the third terminal STR by a charged capacitor bank) into a bucked down lower voltage (for example, 3.3 volts DC) that it then supplied onto the output node. In a case in which the second terminal VOUT is a part of the output node, the 3.3 volts DC is supplied onto the VOUT terminal. The switching of the circuitry that drives the output node from the current switch circuit to the switching converter is referred to as "switch over". Due to the prebiasing of the control loop node of the switching converter, a control loop or loops within the switching converter settle and stabilize faster upon switch over. In one example, the prebiasing of the control loop node is such that immediately after switch over the switching converter is driving the same magnitude of output current onto the output node that was flowing out of the current switch circuit and onto the output node immediately prior to switch over.

In one embodiment, peak power or peak current flow from the first terminal VIN to the second terminal VOUT is not used to set the prebiasing point of the control loop node. Peak output power of the buck converter in driving the output node is also not used to set the prebiasing point of the control loop node. Rather, an filtered form of measured instantaneous current flow through the eFuse immediately prior to switch over is used. In some embodiments, the prebiasing point is set as a function of the measured current flow through the eFuse as well as other parameters. These other parameters, and how the prebiasing point is to be set, may be user programmable through a serial bus interface of the power loss protection integrated circuit.

The foregoing is a summary and thus contains, by necessity, simplifications, generalizations and omissions of detail; consequently it is appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 2 is a larger diagram formed by FIG. 2A and FIG. 2B.

DETAILED DESCRIPTION

Figure 1:
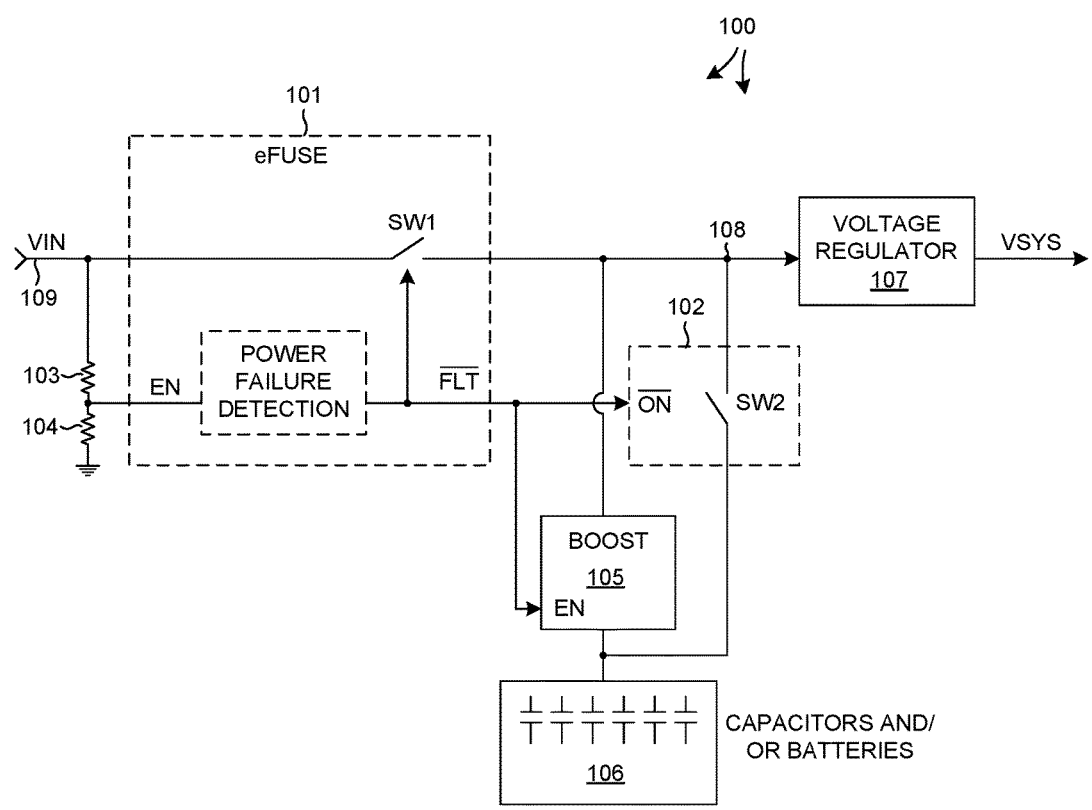
FIG. 1 (Prior Art) is a diagram of an example of a power loss protection system.
Figure 2A:
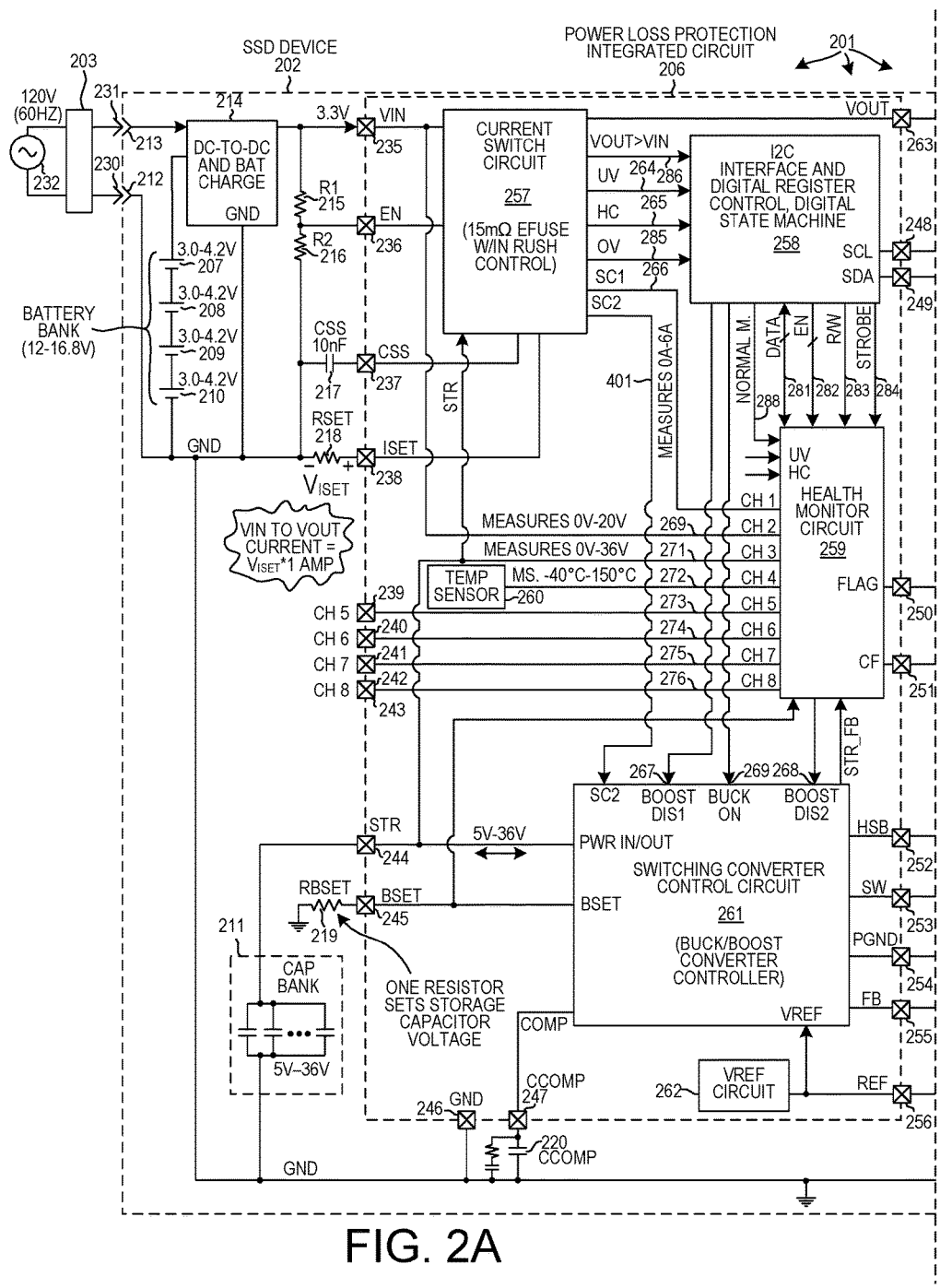
FIG. 2A is a first part of a larger diagram of a system involving a novel power loss protection integrated circuit.
Figure 2B:
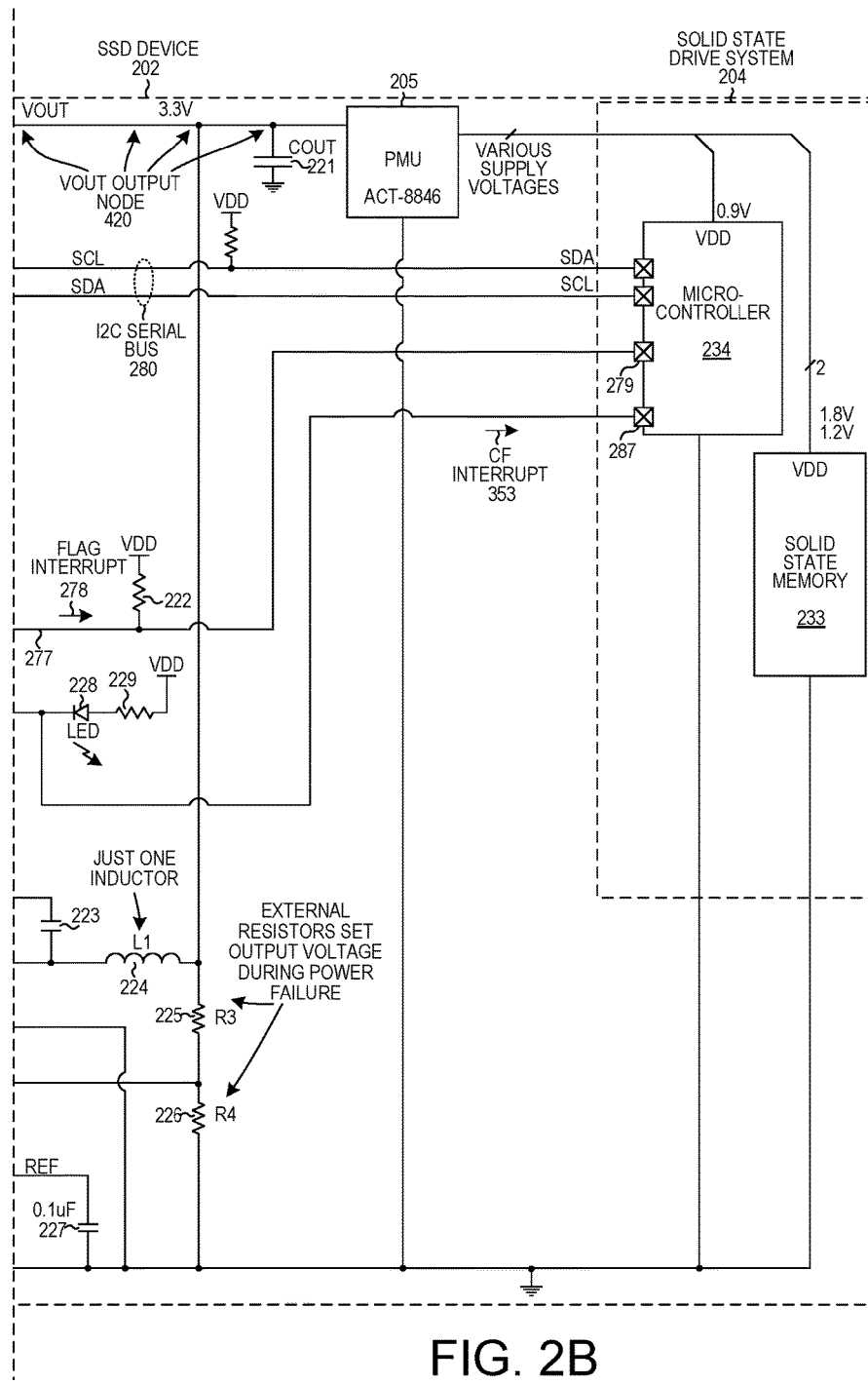
FIG. 2B is a second part of a larger diagram of a system involving a novel power loss protection integrated circuit.

FIG. 2A and FIG. 2B together form a larger diagram, FIG. 2.

FIG. 2 illustrates a system 201 that involves a device to be powered 202, and an AC-to-DC adapter 203. The device 202 in this particular example is a Solid State Drive (SSD) device. It includes a solid state drive system 204, a Power Management Unit (PMU) integrated circuit 205, a power loss protection integrated circuit 206, a bank of series-connected batteries 207-210, a bank of parallel-connected capacitors 211, a socket portion 212 and 213 of a connector, a DC-to-DC converter and battery charger 214, and other discrete components 215-229. The solid state drive system 204 includes, among other components not shown, a solid state memory portion 233 and a microcontroller integrated circuit 234. The AC-to-DC adapter 203 can be connected to the SSD device 202 by plugging its plug portion 230 and 231 into the socket portion 212 and 213 of the SSD device, and the AC-to-DC adapter 203 can be disconnected from the SSD device 202 by unplugging it from the socket portion. The AC-to-DC adapter 203 is coupled to receive power from a 120 volt RMS VAC 60 Hz supply voltage source 232 such as, for example, a standard residential wall socket. The SSD device 202 further includes a printed circuit board (not shown) disposed within an enclosure (not shown). The integrated circuits and other components of the SSD device 202 are mounted to the PCB and are contained in the enclosure.

Power loss protection integrated circuit 206 includes a VIN terminal 235, an EN terminal 236, a CSS terminal 237, an ISET terminal 238, several analog input terminals 239-243, a STR terminal 244, a voltage set input terminal BSET 245, a ground terminal GND 246, a CCOMP terminal 247, a VOUT terminal 263, an SCL terminal 248, a SDA terminal 249, a flag output terminal 250, a capacitor flat terminal CF 251, an HSB terminal 252, a SW terminal 253, a PGND terminal 254, an FB terminal 255, a REF terminal 256, a current switch circuit 257, an I2C interface and digital register control and digital state machine circuit 258, a health monitor circuit 259, an on-chip temperature sensor 260, a buck/boost switching converter control circuit 261, and a reference voltage circuit 262. The "terminals" mentioned above are integrated circuit terminals such as either bond pads of an integrated circuit chip or package terminals of an integrated circuit package that houses the actual integrated circuit chip.

The current switch circuit 257 is also called an eFuse circuit. The current switch circuit 257 can couple the VIN terminal 235 to the VOUT terminal 263 such that current can freely flow from the VIN terminal 235, through the current switch circuit 257, to the VOUT terminal 263, to VOUT output node 420, and to the load. When the current switch circuit 257 is ON in this way, it only introduces a 15 milliohm resistance in that current path. The current switch circuit 257 monitors the voltage on the VIN terminal. If the voltage on the VOUT terminal 263 is greater than the voltage on the VIN terminal 235, then the switch circuit 257 asserts the VOUT>VIN digital signal on conductor 286 to a digital logic high, otherwise the VOUT>VIN digital signal is a digital logic low. If the voltage on the VIN terminal is below an undervoltage value set by resistors 215 and 216, then the current switch circuit 257 is OFF such that the VIN terminal is not coupled to the VOUT terminal through the switch circuit 257. If the current switch circuit 257 detects the "UV" undervoltage condition, then it asserts the UV digital signal on conductor 264 to a digital logic high, otherwise the UV digital signal is a digital logic low. If the voltage on the VIN terminal is above a programmable overvoltage value, then the current switch circuit 257 is OFF such that the VIN terminal is not coupled to the VOUT terminal through the switch circuit 257. If the current switch 257 detects the "OV" overvoltage condition, then it asserts the OV digital signal on the OV conductor 285.

In addition to sensing voltages, the current switch circuit 257 also senses the magnitude of current flowing through the current switch between the VIN terminal and the VOUT terminal. If the current is below a predetermined high current value ($A_{HC}$), and if the current switch 257 is to be ON as determined by the voltage on the VIN terminal, then the current switch is fully ON (to have a resistance of 15 milliohms or less). If, however, the current is detected to reach the high current value ($A_{HC}$), then the current switch circuit begins to regulate the through-current so that the through-current remains at the high current value amount $A_{HC}$ but does not exceed $A_{HC}$. The current switch 257 does this by controlling the gate voltages on a pair of series field effect transistors through which the through-current flows. Increasing the drain-to-source resistance $R_{DS}$ of these field effect transistors allows the flow of current to be maintained at the $A_{HC}$ amount. If, however, the $R_{DS}$ across the transistors becomes too high, or if the voltage on the VOUT terminal decreases too much, then the field effect transistors are not linearly regulated by controlling their $R_{DS}$ resistances, but rather the field effect transistors are turned on and off repeatedly with a duty cycle. The duty cycle is regulated in an attempt to limit the power dropped in the current switch circuit 257. In this way, the current switch circuit 257 serves a function of limiting the magnitude of a possible large inrush current (inrush power) that might otherwise flow into the system when the SSD device is initially plugged into the AC-to-DC adapter 203 when the storage capacitors 211 are fully discharged and when the COUT capacitor 221 is fully discharged. In the present example, the inrush current limit set by the resistance of resistor RSET 218 is a current (for example, two amperes) that is larger than a typical digital logic or analog signaling input terminal or output terminal could handle.

The CSS capacitor 217 slows down the start up slew rate of the current switch circuit 257, thereby providing a "soft start" operation. The board designer can select the capacitance value of the CSS capacitor to tailor the startup slew rate as desired. If left open, the startup slew rate defaults to one millivolt per microsecond. The high current value ($A_{HS}$) is set by setting the resistance value of resistor RSET 218. The high current value $A_{HC}$ is roughly equal to one volt divided by the RSET value in ohms. If the current switch circuit 257 detects the "HC" high current condition, then it asserts the HC digital signal on conductor 265 to digital logic high, otherwise the HC digital signal is a digital logic low. The current switch circuit 257 includes a current sensor/mirror circuit 400 that provides a small auxiliary current flow whose magnitude is proportional to the magnitude of the main current flow through the current switch circuit 257 from the VIN terminal to the VOUT terminal. This small mirrored auxiliary current is converted into a voltage signal by making the current flow across the RSET resistor 218. The resulting voltage signal, whose magnitude is proportional to the current flow through the switch circuit 257, is output from the current switch circuit 257 via the switch current (SC1) conductor 266. The voltage signal SC1 on the switch current SC1 conductor 266 is indicative of the magnitude of the current flowing through the current switch 257.

In addition to voltage signal SC1, the current switch circuit 257 also outputs another signal (SC2). Signal SC2 is a current that is proportional to the current flowing through the current switch 257 from the VIN terminal to the VOUT terminal. This current signal SC2 is communicated via conductor 401 to the switching converter control circuit 261. In the switching converter control circuit 261, the current SC2 is converted into a voltage signal by running the current through a resistor 402.

The buck/boost switching converter control circuit 261, together with external components 220, 221 and 223-227 is operable as a buck switching converter or as a boost switching converter. When it is operating in a boost mode, the converter receives a relatively low voltage from the VOUT terminal, and outputs a boosted up relatively high voltage onto the STR terminal 244. In one example, the voltage on the VOUT terminal is 3.3 volts DC, and the voltage that the converter drives onto the STR terminal 244 is 36 volts DC. This relatively high voltage serves to charge the capacitor bank 211 capacitors up to 36 volts. The magnitude of this charging voltage is set by the value of the RBSET resistor 219. When the converter is operating in a buck mode, the converter receives a relatively high voltage from the STR terminal 244, and outputs a bucked down relatively low voltage onto the VOUT terminal 263. In one example, the voltage on the STR terminal 244 is 36 volts (as set by the RBSET resistor), and the voltage that the converter drives onto the VOUT terminal is 3.3 volts DC. The buck/boost switching converter control circuit 261 has an active high boost disable digital signal input lead BOOST_DIS1 267 and another active high boost disable digital input lead BOOST_DIS2 268. If a digital logic high signal is present on either of these inputs, then the converter is prevented (disabled) from operating in the boost mode. The buck/boost switching converter control circuit 261 also has an active high digital signal input lead BUCK ON 269. If a digital logic high signal is present on this input 269, then the converter is made to start operating in the buck mode.

The health monitor circuit 259 includes an eight-channel sigma-delta Analog-to-Digital Converter (ADC), a set of compare-and-mask circuits, and a digital state machine. The health monitor circuit 259 autonomously monitors the voltages on eight input conductors 266, 269, and 271-276 (8 channels). If any one of these voltages is detected to be below a corresponding lower voltage limit or is detected to be above a corresponding upper voltage limit, then this undervoltage or overvoltage condition is latched into a latch of the detecting compare-and-mask circuit, and the voltage on flag terminal 250 is pulled down to ground potential. The voltage on the open-drain flag terminal 250 is otherwise not pulled down, but rather is pulled up to the VDD supply voltage by external pullup resistor 222. The low voltage (ground potential) on flag terminal 250 and conductor 277 constitutes an interrupt signal 278. This active low interrupt signal 278 is supplied via conductor 277 onto the active low interrupt input terminal 279 of microcontroller 234. The low interrupt signal therefore interrupts the microcontroller 234. The microcontroller 234 can respond to the interrupt, as further explained below, by accessing the power loss protection integrated circuit 206 via the two-wire I2C bus 280. The two conductors SDL and SDA are the two conductors of the I2C bus. The values of the lower voltage limit and the upper voltage limit for each of the eight channels is user programmable (changeable via the microcontroller 234 under software control) via the I2C interface of terminals 248 and 249. In the present example, the measurable voltage range on conductor 266 corresponds to a measured through-current flowing through the current switch 257 in the range of from zero amperes to six amperes. In the present example, the measurable voltage range on conductor 269 corresponds to a measured voltage on the VIN terminal in the range of from zero volts to twenty volts. In the present example, the measurable voltage range on conductor 271 corresponds to a measured storage capacitor voltage on the STR terminal in the range of from zero volts to thirty-six volts. In the present example, the measurable voltage range on conductor 272 corresponds to a measured on-chip temperature in the range of from minus forty degrees Celsius to plus one hundred and fifty degrees Celsius.

The health monitor circuit 259 also includes a capacitor health check circuit 299. The capacitor health check circuit 299 includes a digital state machine. If the power loss protection integrated circuit 206 is not operating in the normal mode as indicated by the active high NORMAL_MODE digital signal on conductor 288, then the capacitor health check circuit is disabled. If, however, the power loss protection integrated circuit 206 has been operating in the normal mode for a least four minutes, at the conclusion of the four minute period the state machine disables the boost converter and enables a ten milliampere current source 350. The ten milliampere current source 350 sinks current from the STR terminal 244. At the end of a time period determined by the programmable value TSET [3:0], the state machine disables the ten milliampere current source 350 and enables a fifty milliampere current source 351 that sinks current from the STR terminal 244. The fifty milliampere current source remains enabled for a period of time determined by the value TSET[3:0]. In one example, this time period is one tenth the period of time the ten milliampere current source was enabled. If at any time during the period of time when either of the two sinking current sources is enabled the voltage on the STR terminal 244 falls below a programmable voltage, then a latch 352 is set. The programmable voltage is determined by the user programmable value THR[3:0]. The setting of the latch causes the voltage on the capacitor fault terminal CF 251 to be pulled down to ground potential. This is an indication of a capacitor fault condition. This active low fault signal 353 may, for example, be supplied onto a second interrupt input terminal 287. In addition, the LED 228 is on during the time when then capacitor fault signal is asserted low.

The I2C interface and digital register control and digital state machine circuit 258 is a digital block that includes an I2C serial bus interface circuit and a digital state machine circuit. There are various digital registers disposed in various places across the integrated circuit. The digital outputs of various ones of the bits of these registers are coupled to various circuits in the integrated circuit so that the stored digital values will control and affect operation of the circuitry. Other selected bits of the registers are used to capture the digital states of corresponding nodes in the circuitry. The I2C interface is usable to read and to write to any selected one of these registers via the DATA conductors 281, the enable conductors 282, the R/W conductor 283 and the strobe conductor 284. The DATA conductors 281, the R/W conductor 283, and the strobe conductor 284 extend to all these registers. For each register, there is one dedicated enable conductor that extends from the I2C interface logic to an enable input lead of that register.

To write an 8-bit value into a particular register, the I2C interface places the data to be written onto the DATA conductors 281. Because the access is a write, the voltage on the R/W conductor 282 is driven to a digital logic low level. The enable conductors to all the registers are driven to be disabled (digital logic low), except for the one desired register that is to be written. The enable conductor to that register is driven with a digital logic high signal. After these signals are set up, the strobe signal on conductor 284 is pulsed high to clock the data into the enabled register. The 8-bit value stored in a particular register can be read by the I2C interface in similar fashion except that the I2C interface does not drive data out on the DATA conductors, but rather the I2C is setup to read in data from the DATA conductors. In addition, the digital logic value driven onto the R/W conductor is a digital logic high value. When the data bus conductors are set up this way, a pulsing of the strobe signal causes the enabled register to output its 8-bit value onto the 8-bit DATA bus, so that the 8-bit value will then be latched into the I2C interface logic. In this way, the I2C interface can read from, and can write to, any selected one of the registers on the integrated circuit.

Figure 3:
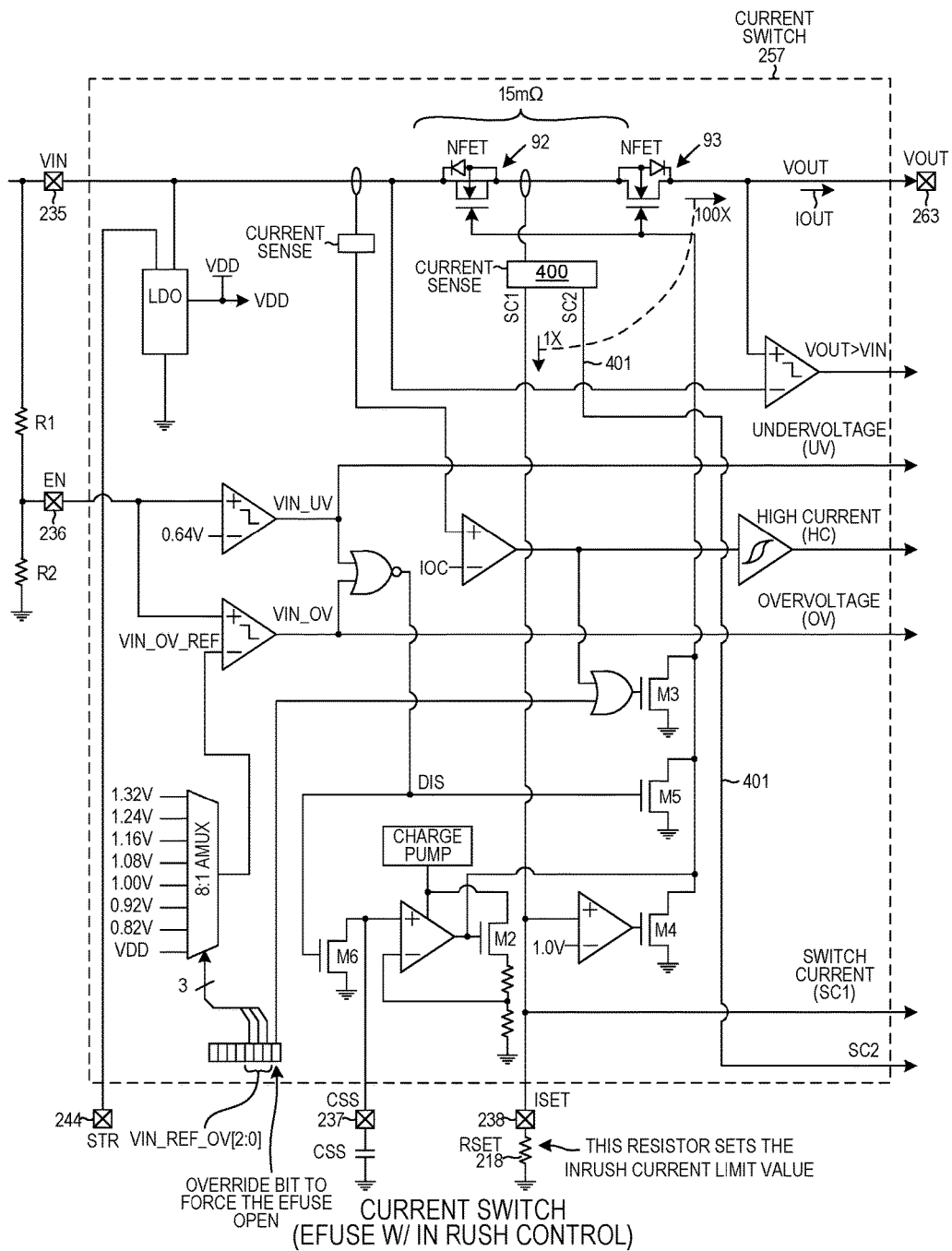
FIG. 3 is a more detailed diagram of the current switch circuit 257 of FIG. 2.

FIG. 3 is a more detailed diagram of the current switch circuit 257 of FIG. 2.

Figure 4:
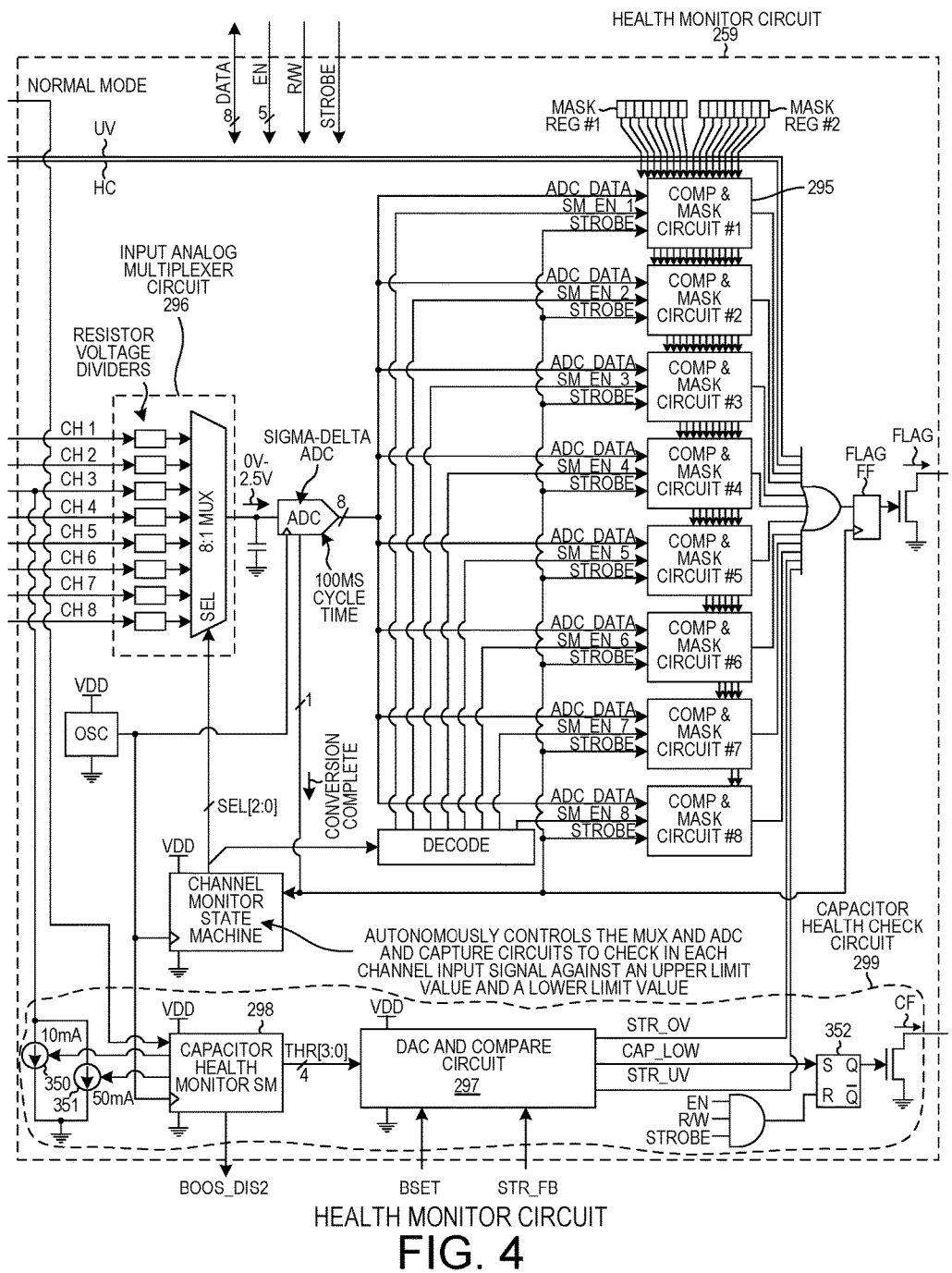
FIG. 4 is a more detailed diagram of the health monitor circuit 259 of FIG. 2.

FIG. 4 is a more detailed diagram of the health monitor circuit 259 of FIG. 2.

Figure 5:
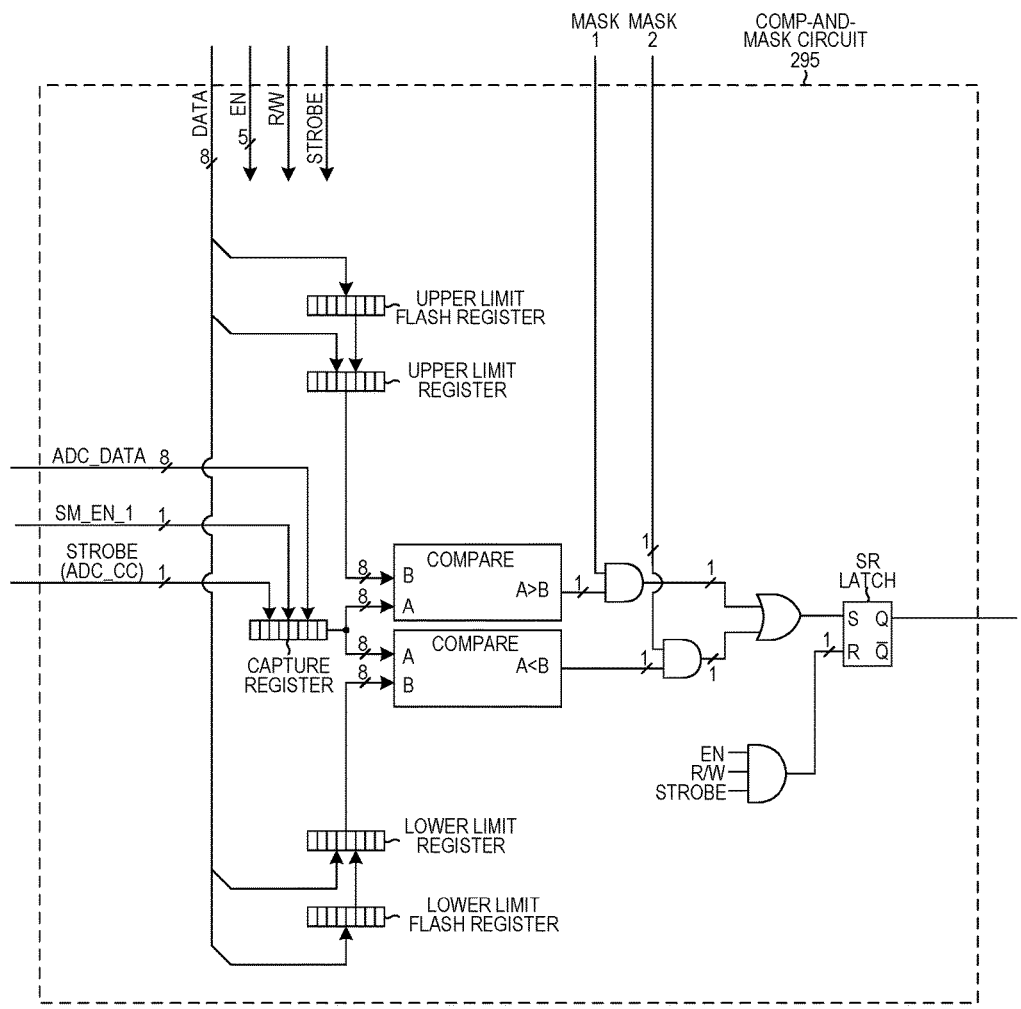
FIG. 5 is a more detailed diagram of one of the compare-and-mask circuits of FIG. 4.

FIG. 5 is a more detailed diagram of one of the compare-and-mask circuits 295 of FIG. 4.

Figure 6:
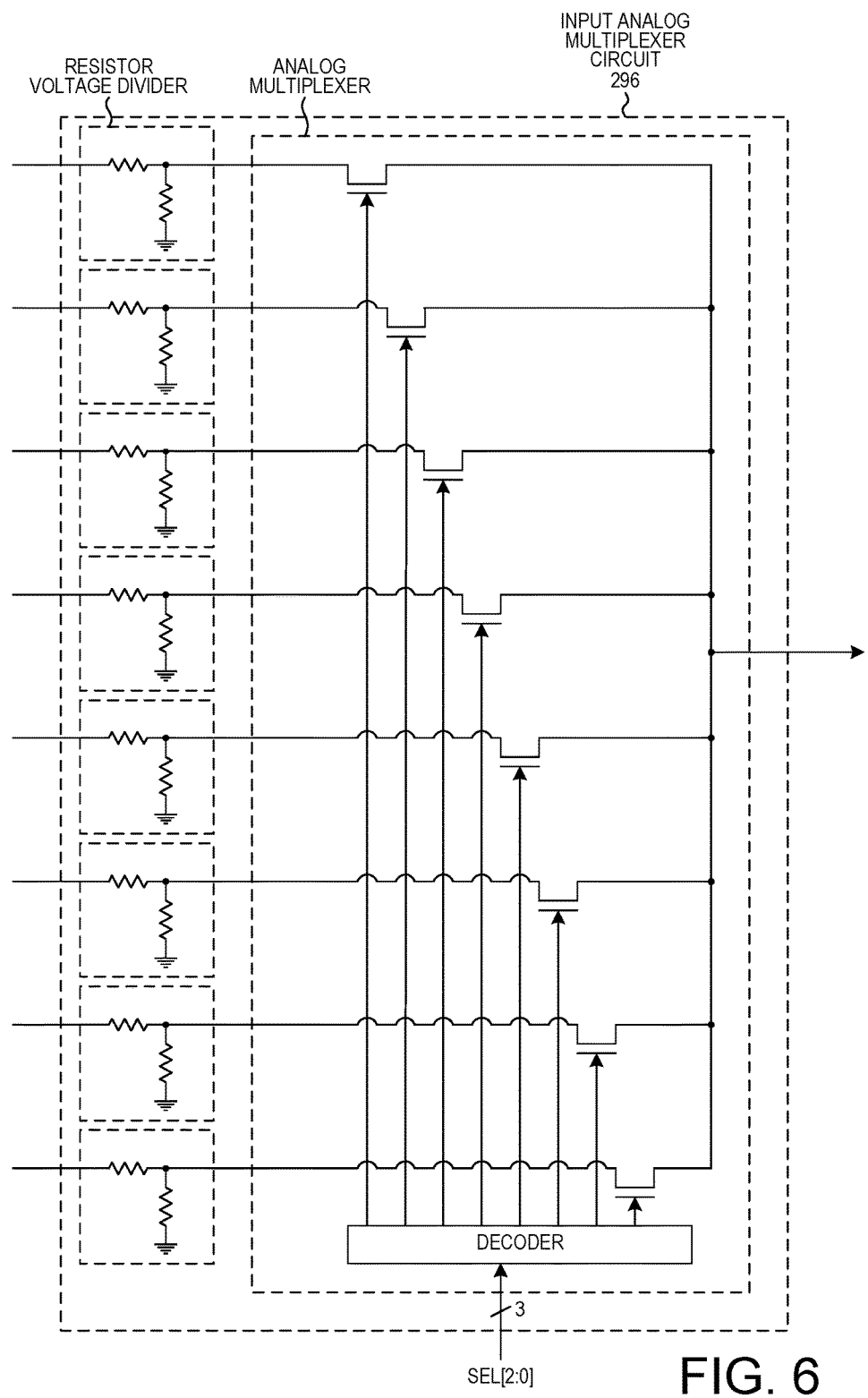
FIG. 6 is a more detailed diagram of the input analog multiplexer circuit of FIG. 4.

FIG. 6 is a more detailed diagram of the input analog multiplexer circuit 296 of FIG. 4.

Figure 7:
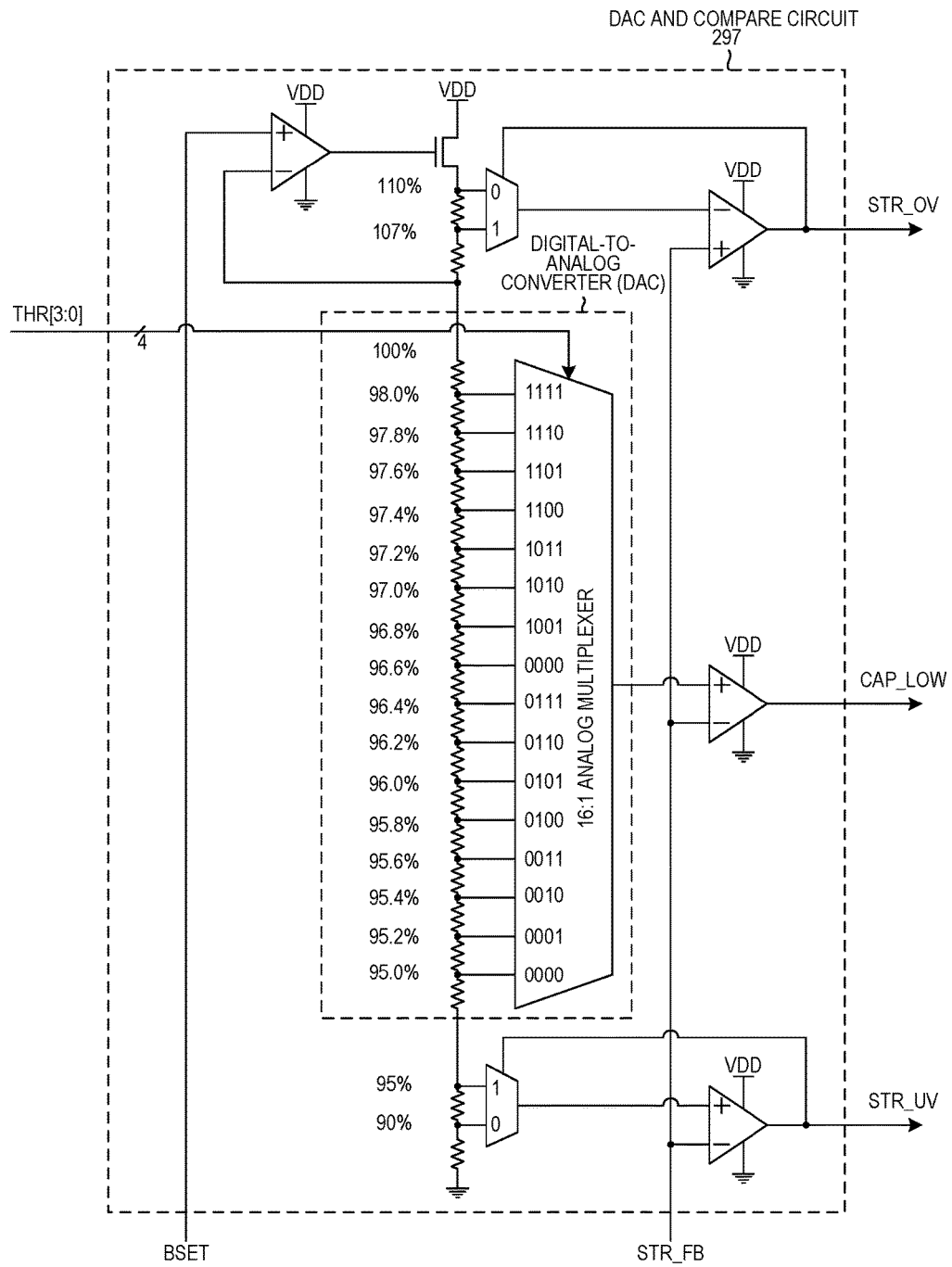
FIG. 7 is a more detailed diagram of the DAC and compare circuit of FIG. 4.

FIG. 7 is a more detailed diagram of the DAC and compare circuit 297 of FIG. 4.

Figure 8:
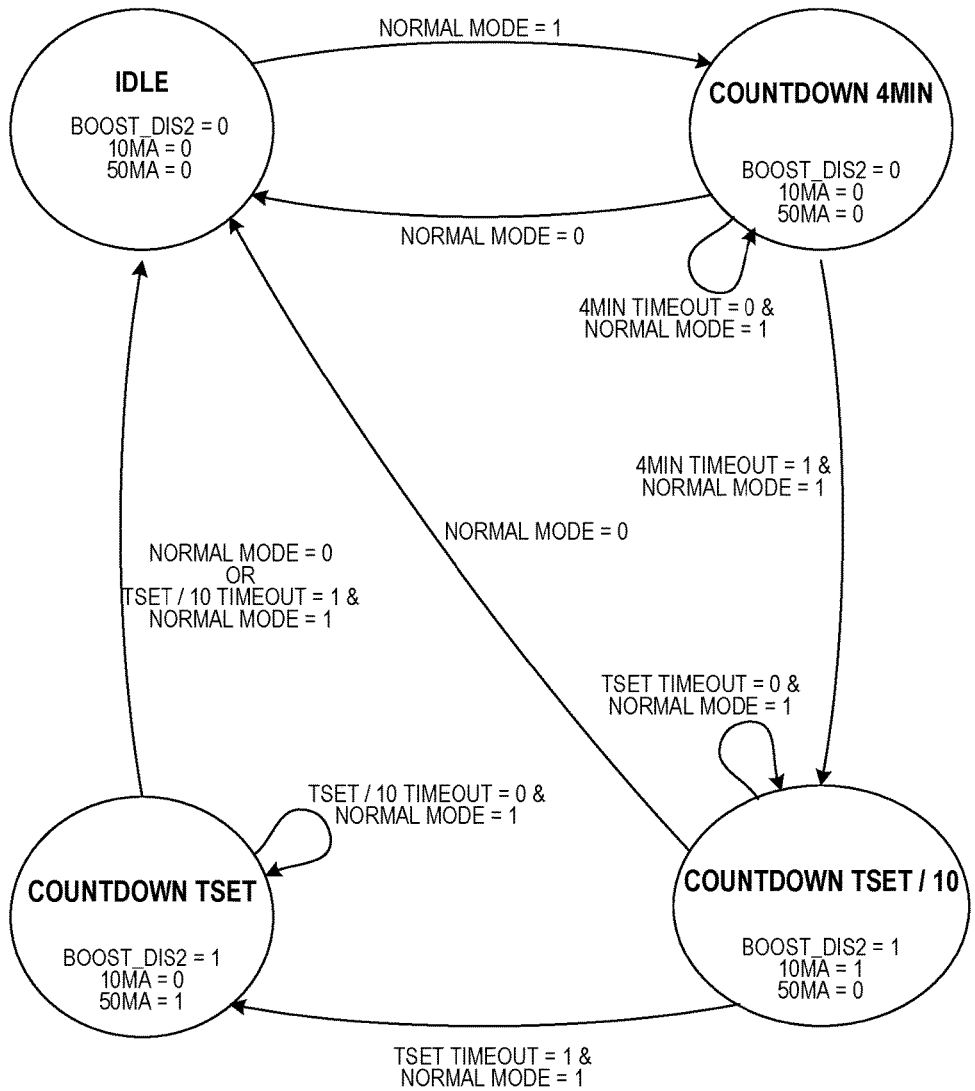
FIG. 8 is a state diagram that sets forth the operation of the capacitor health monitor state machine of the capacitor health check circuit.

FIG. 8 is a state diagram that sets forth the operation of the capacitor health monitor state machine 298 of the capacitor health check circuit 299 of the health monitor circuit 259 of FIG. 4.

Figures 9, 10:
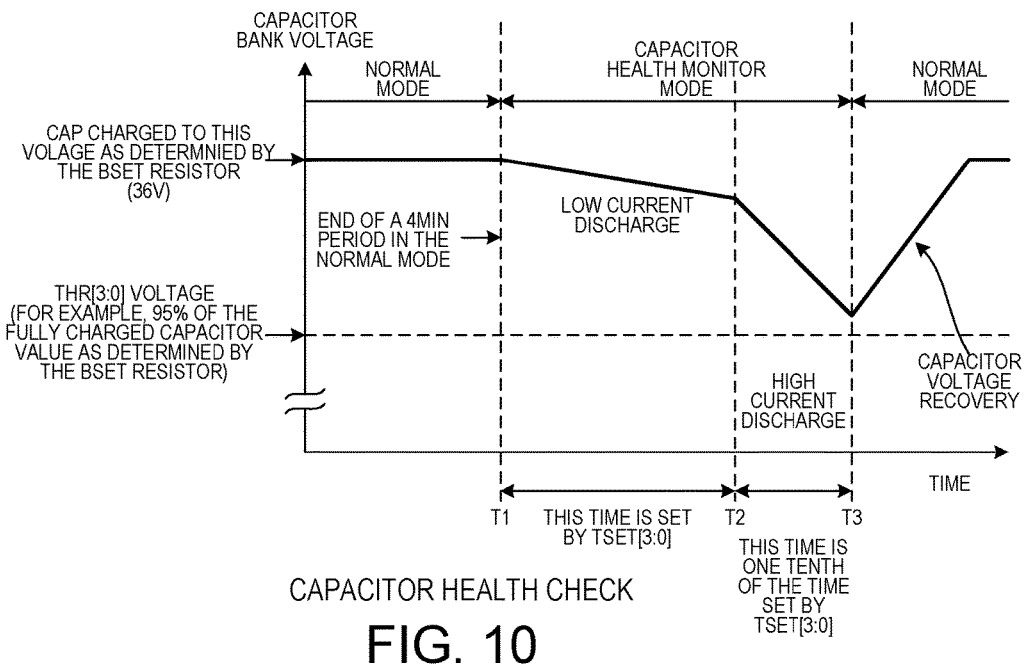
FIG. 9 is a table that indicates, for each 4-bit TSET[3:0] value, the corresponding time period throughout which the ten milliampere current sink is enabled.
FIG. 10 is a diagram that illustrates one capacitor health check operation as carried out by the capacitor health check circuit.

FIG. 9 is a table that indicates, for each 4-bit TSET[3:0] value, the corresponding time period throughout which the ten milliampere current sink is enabled.

FIG. 10 is a diagram that illustrates one capacitor health check operation as carried out by the capacitor health check circuit 299.

Figure 11:
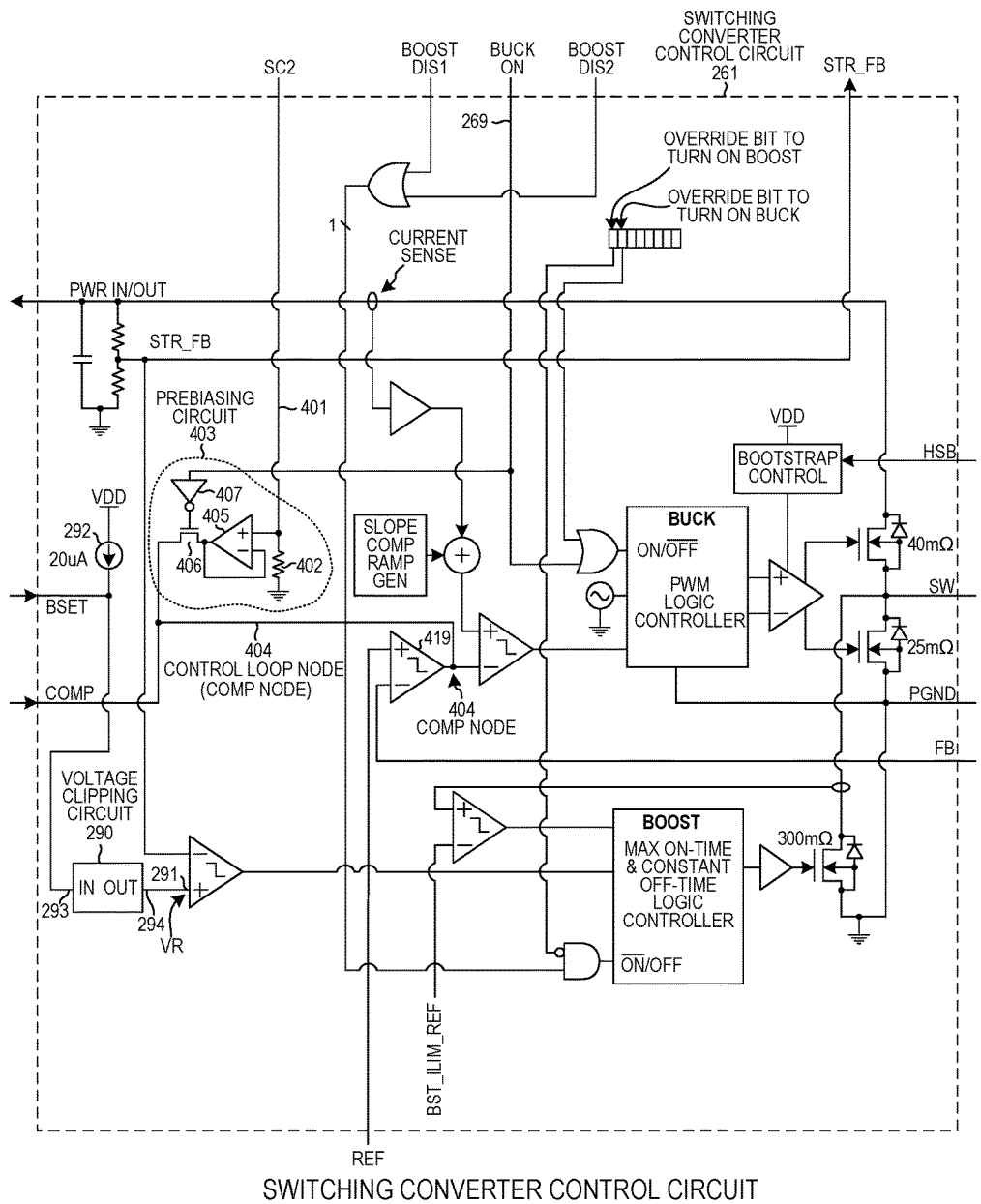
FIG. 11 is a diagram of the switching converter control circuit 261 of FIG. 2.

FIG. 11 is a diagram of the switching converter control circuit 261 of FIG. 2.

Figure 12:
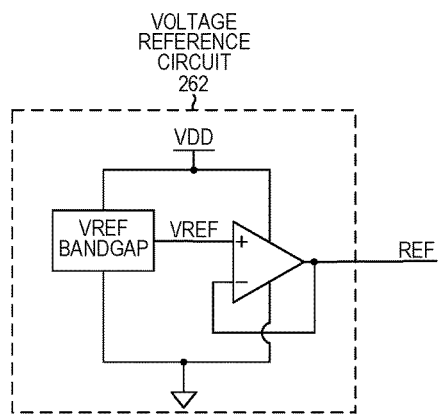
FIG. 12 is a more detailed diagram of the voltage reference circuit 262 of FIG. 2.

FIG. 12 is a more detailed diagram of the voltage reference circuit 262 of FIG. 2.

Figure 13:
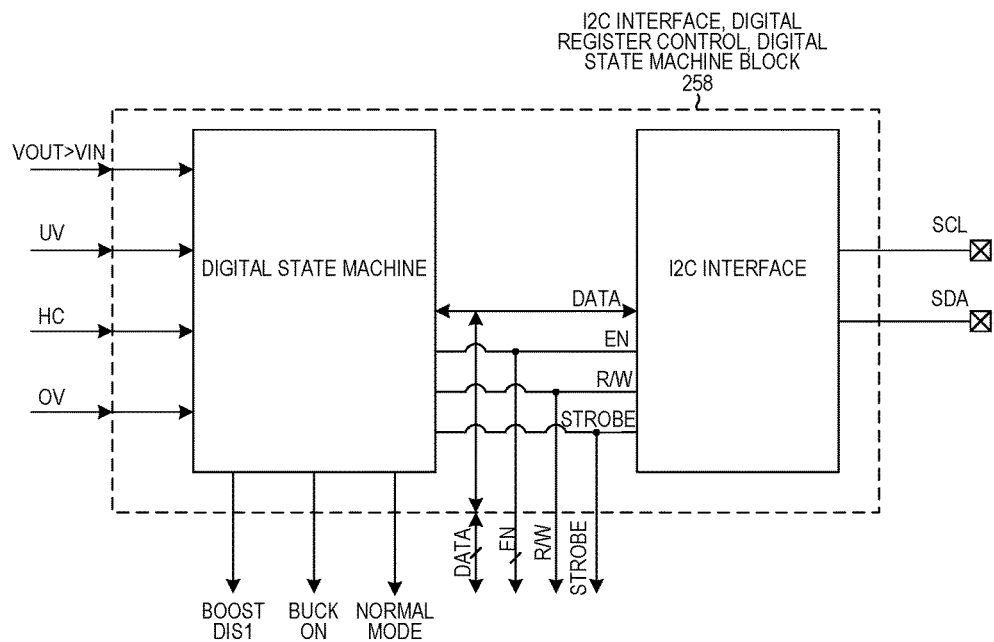
FIG. 13 is a block diagram of the I2C interface and digital register control and digital state machine circuit 258 of FIG. 2.

FIG. 13 is a block diagram of the I2C interface and digital register control and digital state machine circuit 258 of FIG. 2.

Figure 14:
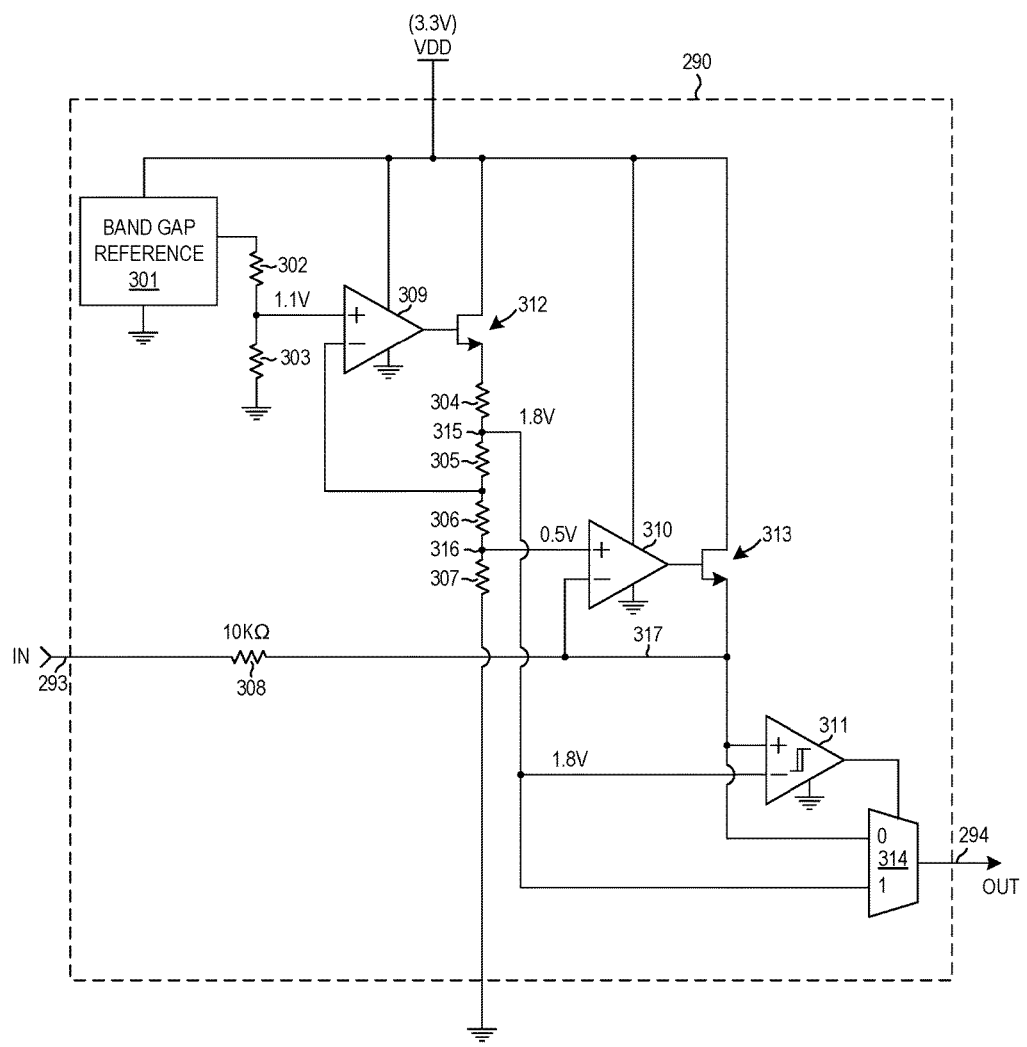
FIG. 14 is a circuit diagram of an example of the voltage clipping circuit 290 of FIG. 11.

The magnitude of the relatively high voltage to which the converter boosts in the boost mode is user programmable, and is set by providing only one external resistor RBSET 219 of the appropriate resistance. Provided that the voltage on the voltage set input terminal BSET 245 is not below a first predetermined voltage V1 and is not above a second predetermined voltage V2, the magnitude of the resistance of this one RBSET resistor 219 corresponds directly to the magnitude of the relatively high voltage to which the STR terminal 244 is driven in the boost mode. The relatively high voltage to which the STR terminal 244 is driven in the boost mode is a gained-up version of the voltage on the BSET terminal 245. The voltage on the BSET terminal 245 is equal to the resistance of the RBSET resistor 219 multiplied by the twenty microampere current supplied by internal current source 292 of FIG. 11. Block 290 in FIG. 11 is a voltage clipping circuit. FIG. 14 is an example of this voltage clipping circuit. If the voltage on the BSET terminal 245 is below the first predetermined voltage V1, then the voltage clipping circuit 290 outputs the first predetermined voltage V1 onto VR node 291. If the first predetermined voltage V1 is present on the VR node 291, then VOUT is set to be the VOUTMIN value. If the voltage on the BSET terminal 245 is above the second predetermined voltage V2, then the voltage clipping circuit 290 outputs the second predetermined voltage V2 onto VR node 291. If the second predetermined voltage V2 is present on the VR node 291, then VOUT is set to be the VOUTMAX value. If the voltage on the BSET terminal 245 is neither below V1 nor above V2, then the voltage clipping circuit 290 transfers the voltage on its IN input 293 to its OUT output 294 and onto the VR input and node 291 of the voltage regulator. The VR input and node 291 of FIG. 11 is a reference voltage input of a voltage regulator. In the case of the charging the capacitor bank 211, the output voltage terminal is the STR terminal 244 because this is the terminal onto which the voltage regulator is outputting the regulated DC output voltage (for example, 36 volts DC). As explained above, the voltage regulator in this case includes circuitry on the integrated circuit 206 as well as external components including inductor 224 L1.

FIG. 14 is a circuit diagram of the voltage clipping circuit 290 of FIG. 11. The voltage clipping circuit 290 includes a bandgap reference 301, seven resistors 302-308, two differential amplifiers 309 and 310, a comparator 311, two N-channel transistors 312-313, and a 2:1 analog multiplexer 314. A bandgap voltage output by the bandgap reference circuit 301 is voltage-divided by a resistor voltage divider involving resistors 302 and 303 such that a stable 1.1 volt reference value is present on the non-inverting input of differential amplifier 309. The output lead of differential amplifier 309 is coupled to drive the gate of N-channel transistor 312. The resistor values of resistors 304-307 are selected such that a 1.8 volt reference voltage value is on node 315 and such that a 0.5 volt reference voltage value is on node 316.

If the voltage on the input node 293 is between 0.5 volts and 1.8 volts, then differential amplifier 310 keeps N-channel transistor 313 off. The input voltage is supplied onto the non-inverting input lead of the comparator 311. Comparator 311 compares the voltage on the input node 293 to the 1.8 volt reference voltage on the inverting input lead of comparator 311, and because the input voltage is less than 1.8 volts, the comparator 311 outputs a digital logic high signal, which causes analog multiplexer to couple the "1" input lead to the multiplexer's output lead. The input signal from the input node 293 is therefore communicated through the voltage clipping circuit 290 to the output node 294.

If, however, the input voltage on the input node 293 is lower than 0.5 volts, then differential amplifier 310 raises the voltage on its output lead until the N-channel transistor 313 is conductive enough that the voltage on node 317 rises and reaches 0.5 volts. The voltage on node 317 stabilizes and is held at 0.5 volts. Due to circuit connections, the 0.5 volt on node 317 is also present on the non-inverting input lead of comparator 311. Comparator 311 therefore outputs a digital logic low signal. The digital logic low signal is supplied onto the select input lead of the multiplexer 314, and this causes the multiplexer 314 to couple its "0" input lead to its output lead. Multiplexer 314 therefore outputs 0.5 volts onto its output lead and onto the OUT node 294.

If, however, the input voltage on the input node 293 is higher than 1.8 volts, then differential amplifier 310 keeps N-channel transistor 313 off. Comparator 311 compares the input voltage on its non-inverting input lead to the 1.8 volt reference voltage on its inverting input lead. Comparator 311 therefore outputs a digital logic high signal onto the select input lead of multiplexer 314. Multiplexer 314 therefore couples the "1" input lead to its output lead. Accordingly, the 1.8 volt reference voltage present on the "1" input lead of the multiplexer 314 is communicated through the multiplexer 314 and to the OUT output node 294.

The sense current signal SC2 is a sense current that is proportional to the current flow passing through the eFuse (through current switch circuit) 257 and out of the VOUT terminal 263 to the load. The load in this case is PMU 205 and the solid state drive system 204. This sense current signal SC2 is communicated from the current switch circuit 257 via conductor 401 to the switching converter control circuit 261. In the switching converter control circuit 261 the sense current signal SC2 is converted into a sense voltage signal by running the current signal through a resistor 402. A voltage buffer circuit 403 supplies a buffered version of this sense voltage onto the comp node 404 when buck mode operation of the switching converter is disabled. The comp node 404 is the control loop node at the output of the feedback loop error amplifier 419. The supplying of the buffered version of the sense voltage onto the comp node 404 serves to prebias the voltage on the comp node 404 to a voltage that is fairly close to the voltage that would otherwise be on the comp node 404 were the switching converter operating in the buck mode and supplying the same load. The sense current signal SC2 has a current magnitude that is proportional to the amount of output current IOUT that must be output from the VOUT terminal 263 to the load in order to maintain the desired regulated 3.3 volts at the load. Accordingly, if input power received onto the power loss protection integrated circuit 206 via power input connector terminals 212 and 213 were to be suddenly lost, then this same amount of output load current IOUT would then have to then be supplied to the load using the cap bank 211 as an energy source. Because the magnitude of the load does not typically change when input power (power received from AC-to-DC adapter 203) is lost in this way, the detected load current flowing through the eFuse 257 just prior to the loss of power as measured by the signal SC2 is usable to prebias the voltage on the comp node 404 within the buck converter circuit so that when the buck converter circuit is enabled upon the power loss condition the buck converter circuit will drive the same amount of load current onto the load that was driven just prior to the loss of power by the eFuse 257. This prebiasing of the voltage on the comp node 404 reduces the amount of time required for the control loop of the buck converter circuit to stabilize for its steady state operation in taking energy from the cap bank 211 (for example, at an initial 36 volts), and bucking this high voltage down to 3.3 volts DC, and driving the appropriate amount of current at the lower 3.3 volts out to the load. The voltage buffer circuit 403 that drives the prebias voltage onto the comp node 404 is disabled (so that it does not drive the comp node) by the BUCK ON signal received via BUCK ON input and conductor 269 during times when the switching converter is operating as a buck converter. Voltage buffer circuit 403 comprises the resistor 402, an operational amplifier 405 connected as a voltage follower, a N-channel transistor 406 operating as a switch, and an inverter 407. In other examples, the operational amplifier is coupled to have voltage gain. In other examples, the operational amplifier is coupled as a transconductance amplifier so that it outputs a current whose magnitude is proportional to the sense voltage dropped across resistor 402.

Figure 15:
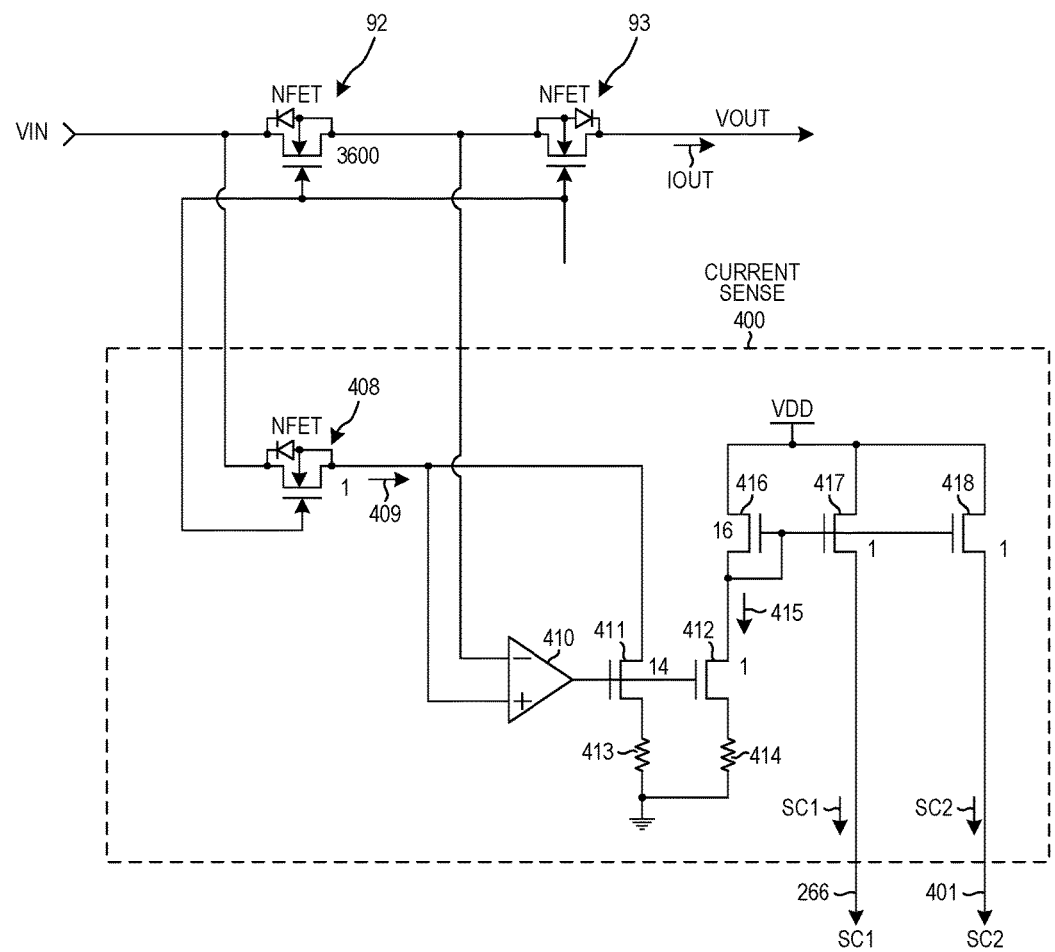
FIG. 15 is a more detailed diagram of one example of the current sense circuit 400 of FIG. 3.

FIG. 15 is a more detailed diagram of one example of the current sense circuit 400 of FIG. 3. Transistors 92 and 93 are the same transistors as shown in FIG. 3. Transistor 408 is connected as a current sense FET. The ratio of the transistor sizes of transistor 92 to transistor 408 is 3600:1. The operational amplifier 410 modulates the current 409 such that the voltages on the positive and negative differential input terminals of the operational amplifier 410 are equal. This means that the source voltages of transistors 92 and 408 are equal, and they therefore carry ratiometric current. The small sense current 409 is in turn mirrored by N-channel transistors 411 and 412 and resistors 413 and 414, into a current 415. This current 415 is in turn mirrored by P-channel transistors 416, 417 and 418. The current mirror ratios are such that the sense current SC2 varies by 1.25 microamperes per ampere of current IOUT.

Figure 16:
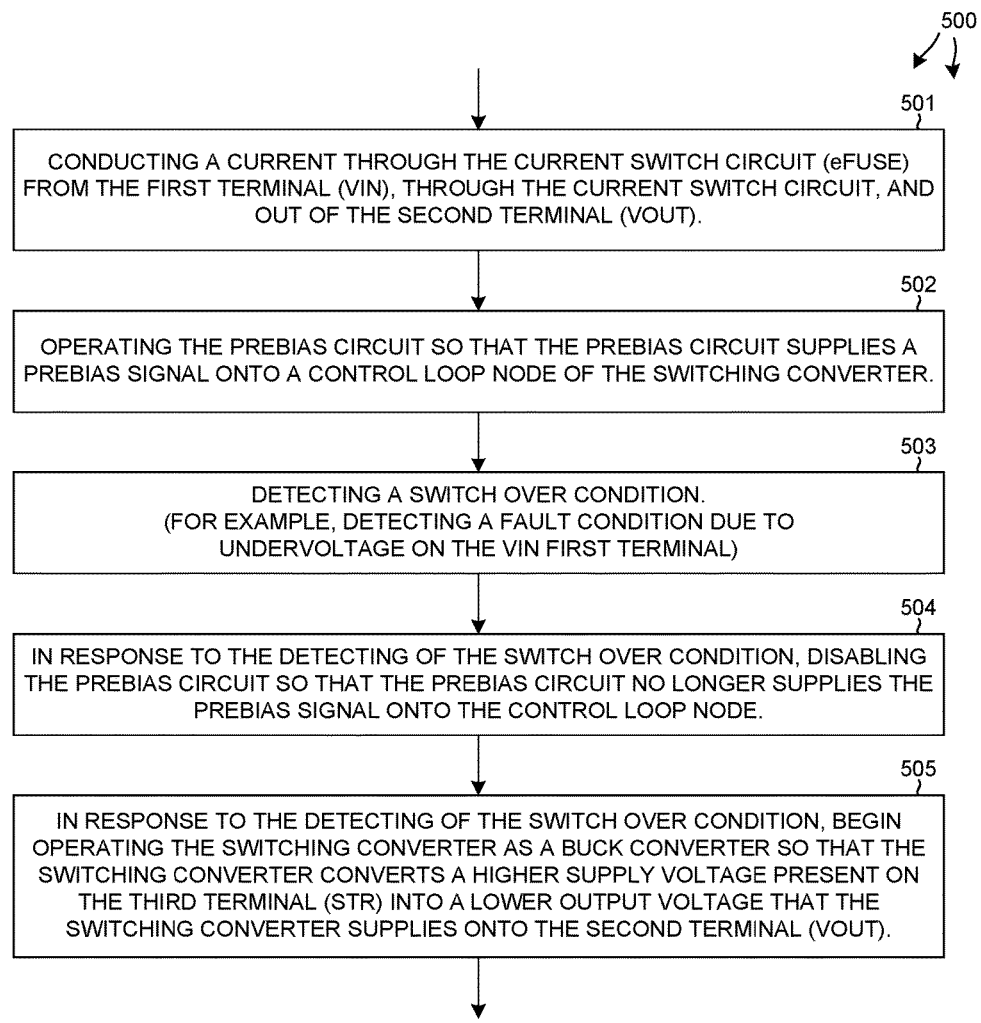
FIG. 16 is a flowchart of a method in accordance with one novel aspect.

FIG. 16 is a flowchart of a prebiasing method 500 in accordance with one novel aspect. Initially, the power protection integrated circuit 206 is operating in the normal mode. The AC-to-DC adapter and battery charger 214 is on and operational. A 3.3 volt DC supply voltage is being supplied by the AC-to-DC adapter and battery charger 214 onto the VIN terminal 235. Current is flowing (step 501) from the VIN terminal 235, through the current switch circuit 257 (the eFuse) to the VOUT terminal 263, to the VOUT output node 420, and to the load. The VOUT terminal 263 in this case is a part of the VOUT output node 420. The current switch circuit 257 (the eFuse) is fully on and has a low resistance in the flow of this current as explained above. During this time of normal mode operation, the prebias circuit 403 is operated (step 502) so that the prebias circuit 403 supplies the prebias signal onto the control loop node 404 (the comp node) of the switching converter control circuit 261 of the overall switching converter. As explained above, the overall switching converter includes the switching converter control circuit 261 as well as external components 220, 221 and 223-227. The magnitude of the prebias signal varies with, and is a function of, the magnitude of current flow through the current switch circuit 257. Next, a switch over condition is detected (step 503). In one example, the switch over condition is a fault condition. In one particular example, the fault condition is an undervoltage condition (UV) on the VIN terminal 235. In response to this detecting of this switch over condition, the prebias circuit 403 is disabled (step 504). In one example, this is carried out by asserting the BUCK ON digital signal. The prebias circuit 403 is disabled so that the prebias circuit 403 no longer supplies the prebias signal onto the control loop node 404. In response to this detecting of this switch over condition, the switching converter begins operating as a buck converter so that the switching converter converts a relatively higher voltage present on the STR terminal 244 into a relatively lower voltage that the switching converter supplies onto the VOUT terminal 263. In one example, the relatively higher voltage present on the STR terminal 244 is a 36 volt voltage on the capacitor bank 211. The switching converter (operating as a buck converter) uses energy from this capacitor bank to maintain the 3.3 volts DC that was supplied onto the VOUT terminal 263 and the output node 420 during normal mode operation. The 3.3 volts DC is maintained on the VOUT terminal 263 and the output node 420 despite the loss of power at the VIN input terminal 235 and despite the driving of the VOUT terminal 263 and output node by the switching converter (operating as a buck converter). Over time, as the switching converter operates as a buck converter and drives the output node 420, energy is taken out of the capacitor bank 211 and consequently the voltage on the capacitor bank 211 decreases. If the loss of power at the VIN terminal 235 is of long enough duration, all the energy will be drained from the capacitor bank 211 and the switching converter will eventually by unable to keep the voltage on the output node 420 at 3.3 volts. The overall system 201 of FIG. 2 is designed so that the 3.3 volt DC supply voltage is present on the output node 420 long enough that microcontroller 234 and solid state memory portion 233 can backup and store data before the 3.3 volt supply voltage on the output node 420 can no longer be maintained.

In the example above, the example of the switch over condition was a fault condition. The switch over condition may, however, be another type of switch over condition. For example, the switch over condition may be a command receive condition in which a switch over command is received onto the power loss protection integrated circuit 206 from the microcontroller 234 via the I2C serial bus 280. This switch over command is received onto the integrated circuit 206, and is detected in block 258 to be a switch over command. This is another example of the detecting of the switch over condition step 503. There are also fault conditions other than the UV undervoltage condition that can be detected in the detecting of the switch over condition step 503. The switch over condition can be an overvoltage condition (VOUT>VIN) in which the VOUT voltage on the terminal 263 is more than a predetermined voltage (for example, 560 mV) higher than the VIN voltage on terminal 235. The switch over condition can be an overcurrent condition (HC) in which the current flow through the current switch circuit 257 from the VIN terminal 235 to the VOUT terminal 263 exceeds a predetermined current value. The switch over condition can be an overvoltage condition (OV) in which the voltage on the VIN terminal 235 exceeds a predetermined voltage value. The detecting of the switch over condition of step 503 can be a detecting of any one or more of these conditions.

Although certain specific embodiments are described above for instructional purposes, the teachings of this patent document have general applicability and are not limited to the specific embodiments described above. Although an example prebias circuit is set forth above that drives a prebias signal onto the control loop node 404 that is a function of the magnitude of current flow through the eFuse and is not function of other voltages and currents, in another example the magnitude of the prebias signal is a function of the capacitor bank voltage at the time of switch over as well as the magnitude of current flow through the eFuse. Depending on the type of control loop employed in the buck converter, the prebias signal may be a voltage signal or may be a current signal. The prebias signal may be driven onto the control loop node directly as in the example presented above the signal being driven through transistor 406 in its on state, or may be supplied onto the control loop node through a component such as through a resistor or a resistor network. The prebiasing of the control loop node may be stopped at the same time that the switching converter begins to operate as a buck converter, or there may be a slight difference in these times. Although an example is presented above in which only one control loop node is prebiased, in other examples it may be desirable to prebias multiple control loop nodes within the switching converter. The output node may include the VOUT terminal of the power loss protection integrated circuit, but in other embodiments the output node is a node external to the power loss protection integrated circuit. Accordingly, various modifications, adaptations, and combinations of various features of the described embodiments can be practiced without departing from the scope of the invention as set forth in the claims.

What is claimed is:

1. An integrated circuit comprising:
   a first terminal;
   a second terminal;
   a current switch circuit that has an on state and an off state, wherein in the on state the current switch circuit provides a low resistance current path from the first terminal, through the current switch circuit, out of the integrated circuit via the second terminal, and to an output node, wherein in the off state the current switch circuit decouples the first terminal from the second terminal, and wherein the current switch circuit outputs a sense current signal indicative of a magnitude of a current flow through the current switch circuit;
   a third terminal;
   a switching converter control circuit that is a part of a switching converter, wherein the switching converter has a buck on state, wherein the switching converter control circuit is coupled to receive a voltage from the third terminal such that the switching converter in the buck on state drives a regulated voltage onto the output node, wherein the switching converter control circuit has a control loop node, and wherein if the switching converter is not in the buck on state then the switching converter does not drive any regulated voltage onto the output node; and
   a prebiasing circuit that receives the sense current signal from the current switch circuit and that is coupled to drive a prebias signal onto the control loop node, wherein the prebiasing circuit is enabled to drive the prebias signal onto the control loop node if the switching converter is not in the buck on state, and wherein the prebiasing circuit is disabled from driving the prebias signal onto the control loop node if the switching converter is in the buck on state.

2. The integrated circuit of claim 1, wherein the sense current signal is a current signal that has a magnitude that is proportional to a magnitude of current flow from the first terminal, through the current switch circuit, and to the second terminal.

3. The integrated circuit of claim 1, wherein the prebias signal that the prebiasing circuit drives onto the control loop node has a magnitude that is a function of a magnitude of current flow from the first terminal, through the current switch circuit, and to the second terminal.

4. The integrated circuit of claim 1, wherein the switching converter comprises the switching converter control circuit as well as additional circuit components that are external to the integrated circuit.

5. The integrated circuit of claim 1, wherein the second terminal is a part of the output node.

6. The integrated circuit of claim 1, wherein the switching converter control circuit has an error amplifier, and wherein the error amplifier is coupled to drive the control loop node when the switching converter is in the buck on state.

7. The integrated circuit of claim 1, wherein the prebias signal is a voltage signal.

8. The integrated circuit of claim 1, further comprising:
   a fourth terminal that is coupled to the control loop node.

9. The integrated circuit of claim 1, wherein the switching converter also has a boost on state, and wherein the switching converter in the boost on state outputs a current from the integrated circuit via the third terminal.

10. The integrated circuit of claim 1, wherein the prebiasing circuit is enabled to drive the prebias signal onto the control loop node at a time immediately prior to the switching converter entering the buck on state, and wherein the prebiasing circuit is disabled from driving the control loop node upon the switching converter entering the buck on state.

11. The integrated circuit of claim 1, wherein the third terminal is adapted to be coupled to a capacitor bank.

12. The integrated circuit of claim 1, wherein the third terminal is coupled to a capacitor external to the integrated circuit.

13. A method comprising:
   (a) conducting current through a current switch circuit from a first terminal, through the current switch circuit, and out of the second terminal;
   (b) operating a prebias circuit so that the prebias circuit supplies a prebias signal onto a control loop node of a switching converter;
   (c) detecting a switch over condition;
   (d) in response to the detecting of the switch over condition in (c) disabling the prebias circuit so that the prebias circuit no longer supplies the prebias signal onto the control loop node; and
   (e) in response to the detecting of the switch over condition in (c) begin operating the switching converter as a buck converter so that the switching converter converts a higher voltage present on a third terminal into a lower voltage that the switching converter supplies onto the second terminal, wherein the switching converter is not operating as a buck converter in (a) through (c), and wherein the first terminal, the second terminal, the third terminal, the current switch circuit, the prebias circuit, and the control loop node are parts of an integrated circuit.

14. The method of claim 13, wherein a first part of the switching converter is disposed on the integrated circuit but a second part of the switching converter is external to the integrated circuit.

15. The method of claim 13, wherein the switch over condition is a fault condition.

16. The method of claim 13, wherein the switch over condition is a command receive condition.

17. The method of claim 13, wherein the switch over condition is an undervoltage condition on the first terminal.

18. The method of claim 13, wherein the switch over condition is taken from the group consisting of: a command receive condition, an overvoltage condition (VOUT>VIN) in which a voltage VOUT on the second terminal is more than a predetermined voltage higher than a voltage VIN on the first terminal, an undervoltage condition (UV) on the first terminal, a overcurrent condition (HC) through the current switch circuit from the first terminal to the second terminal, and an overvoltage condition (OV) on the first terminal.

19. An integrated circuit comprising: a first terminal; a second terminal; a current switch circuit that has an on state and an off state, wherein in the on state the current switch circuit provides a low resistance current path from the first terminal, through the current switch circuit, out of the integrated circuit via the second terminal, and to an output node, and wherein in the off state the current switch circuit decouples the first terminal from the second terminal; a third terminal; a switching converter control circuit that is a part of a switching converter, wherein the switching converter has a buck on state, wherein the switching converter control circuit is coupled to receive a voltage from the third terminal such that the switching converter in the buck on state drives a regulated lower voltage onto the output node, wherein the switching converter control circuit has a control loop node, wherein if the switching converter is not in the buck on state then the switching converter does not drive any regulated voltage onto the output node, and wherein the current switch circuit is in its off state if the switching converter is in the buck on state; and a prebiasing circuit that is coupled to drive a prebias signal onto the control loop node, and wherein the prebiasing circuit drives a prebias signal onto the control loop node when the current switch circuit is in its on state, and wherein the prebiasing circuit is disabled from driving any signal onto the control loop node if the switching converter is in the buck on state.

20. The integrated circuit of claim 19, wherein the prebiasing circuit receives a digital logic enable signal, wherein the prebiasing circuit is enabled to drive the prebias signal onto the control loop node if the digital logic enable signal has a first digital logic value, and wherein the prebiasing circuit is disabled from driving any signal onto the control loop node if the digital logic enable signal has a second digital logic value.

21. The integrated circuit of claim 20, further comprising:
a serial bus interface adapted to receive a switch over command from a serial bus and in response to cause the digital logic enable signal to transition digital logic states from the first digital logic value to the second digital logic value.

\* \* \* \* \*